No. 668,878. Patented Feb. 26, 1901.
C. C. JENSEN.
ROTARY ENGINE.
(Application filed Sept. 6, 1900.)
(No Model.) 2 Sheets—Sheet 1.

WITNESSES
INVENTOR
Carl C. Jensen.
BY
ATTORNEYS

No. 668,878. Patented Feb. 26, 1901.
C. C. JENSEN.
ROTARY ENGINE.
(Application filed Sept. 6, 1900.)
(No Model.) 2 Sheets—Sheet 2.

WITNESSES
A. H. Davis
J. B. Owens

INVENTOR
Carl C. Jensen
BY
ATTORNEYS

UNITED STATES PATENT OFFICE.

CARL CHRISTIAN JENSEN, OF COPENHAGEN, DENMARK.

ROTARY ENGINE.

SPECIFICATION forming part of Letters Patent No. 668,878, dated February 26, 1901.

Application filed September 6, 1900. Serial No. 29,158. (No model.)

*To all whom it may concern:*

Be it known that I, CARL CHRISTIAN JENSEN, assistant marine engineer, of 15 Haregade, Copenhagen, in the Kingdom of Denmark, have invented certain new and useful Improvements in Rotary Engines, of which the following is a specification.

The present invention refers to certain improvements in connection with rotary engines, especially steam-engines, by means of which the period of admission or cut-off and the period of expansion may be easily regulated and the direction of motion of the engine readily reversed. The said results are obtained by means of a main slide-valve arranged adjustably upon the rotary shaft, in combination with an expansion slide-valve placed between the said main slide-valve and the shaft and with steam-passages passing through the rotary shaft itself. A form of construction for such an engine is illustrated in the accompanying drawings, in which—

Figure 1:
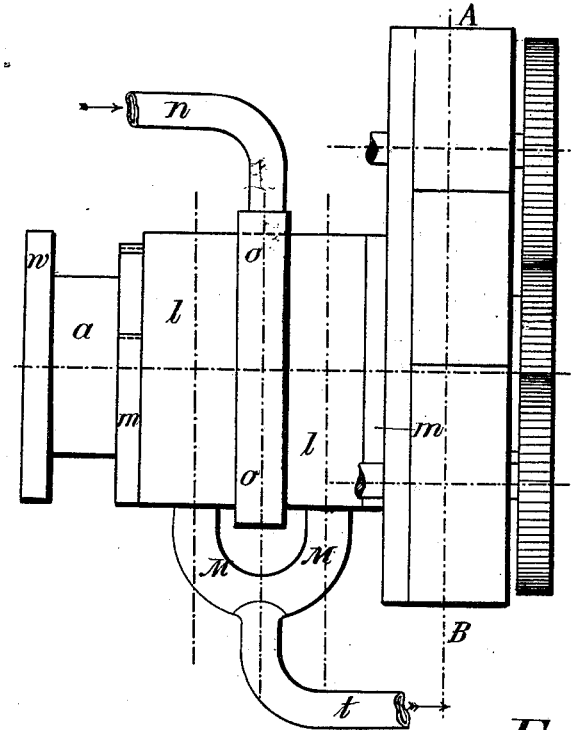
Figures 2, 3:
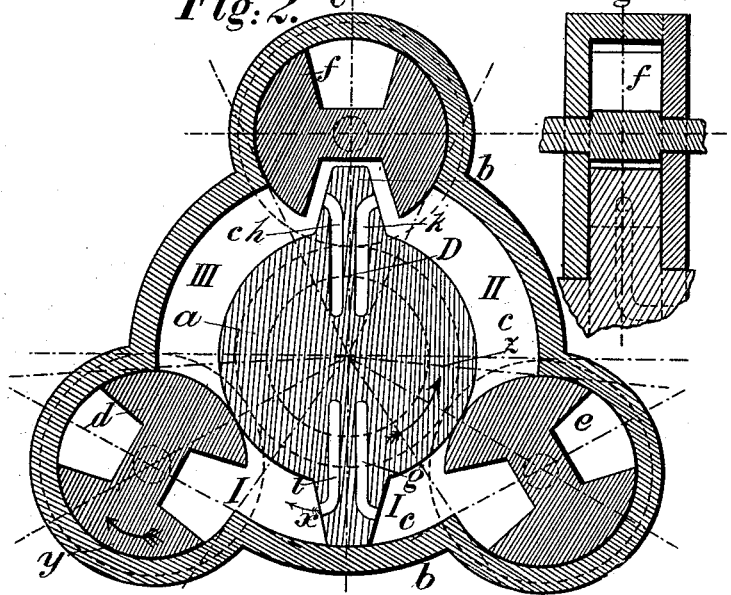
Figure 4:
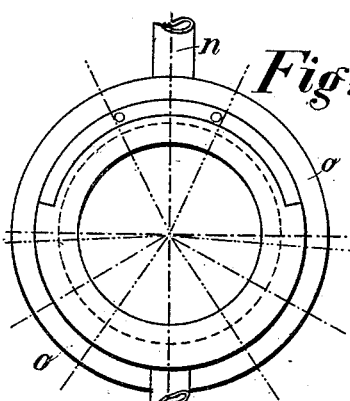
Figure 5:
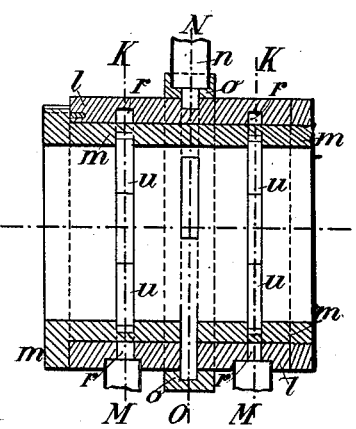
Figure 9:
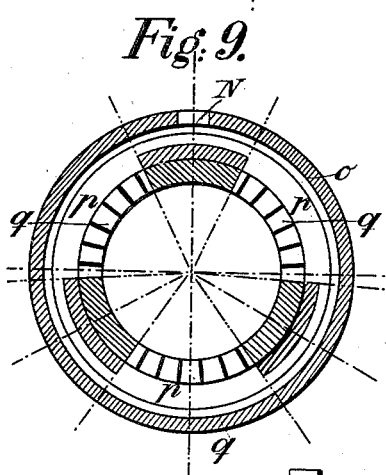
Figure 7:
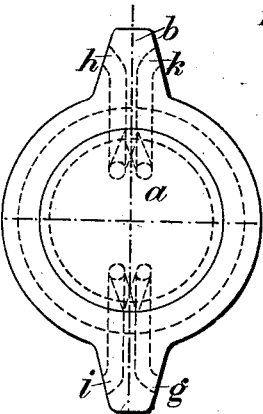
Figure 8:
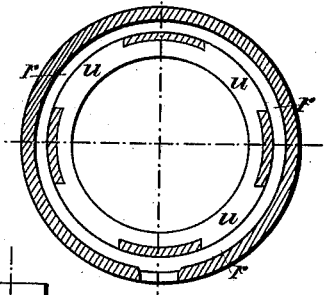
Figure 6:
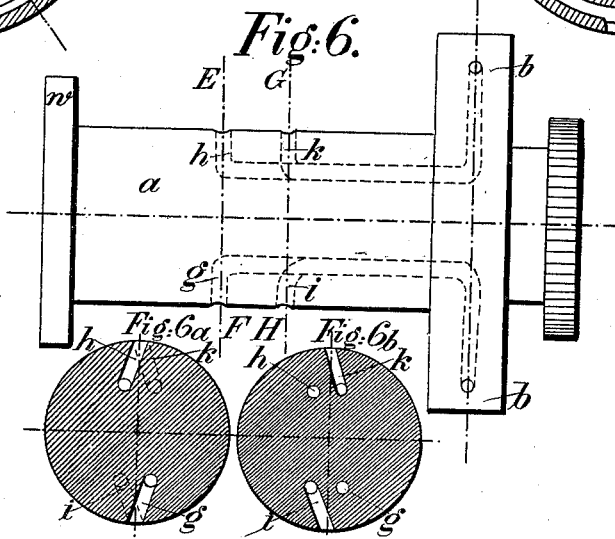

Figure 1 is a side elevation of the engine. Fig. 2 is a section on the line A B of Fig. 1. Fig. 3 is a section on the line C D of Fig. 2. Figs. 4 and 5 represent the main slide-valve and the expansion slide-valve in end view and in longitudinal section, respectively. Figs. 6, 6ª, and 6ᵇ show the rotary shaft in side elevation and two sections through the shaft on the lines E F and G H of Fig. 6. Fig. 7 is an end view of the rotary shaft. Fig. 8 is a section on the line K M of Fig. 5 through the main and expansion slide-valve. Fig. 9 is a section through the main and expansion slide-valve on the line N O in Fig. 5.

As is shown in Figs. 1 and 2, the engine consists in a well-known manner of a rotary shaft *a*, provided with projections *b*, forming the pistons of an annular channel or belt *c*, surrounding the rotary shaft. This belt *c* is by means of cylindrical disks *d e f* divided into three working chambers I II III, of which the said disks form the bottom. The disks are driven from the rotary shaft by means of gear-wheels in such a manner that the pistons *b* may freely pass the said disks, each of these being provided with two recesses or cuttings placed diametrically opposite each other and of a shape that corresponds with that of the pistons.

In the rotary shaft *a* are arranged two pairs of channels *g h* and *i k*, of which the one pair serves for admission of the steam when the other pair serves for the exhaust, or vice versa. The said channels open with one end on the cylindrical surface of the rotary shaft and with the other end on the side of the piston. The two openings on the cylindrical surface of the rotary shaft belonging to one pair of channels are placed at the same distance from the end of the shaft, and the other ends of the same pair of channels open on corresponding sides of the pistons.

On the rotary shaft *a* is arranged an annular main slide-valve *l*, and between this one and the shaft is placed the annular expansion slide-valve *m*.

Steam is admitted to the main slide-valve *l* through the steam-pipe *n*, that opens into a ring-shaped channel or belt *o*, from which the steam passes through ports *p* in the main slide and corresponding ports *q* in the expansion-slide to the openings of one pair of channels in the rotary shaft. The main slide-valve is further provided with two annular exhaust-passages *r r*, arranged one on each side of the ring-shaped belt *o* and at equal distances from the same. The two exhaust-passages are joined together into one common exhaust-pipe *t*.

The exhaust-ports *r r* in the main slide-valve correspond with exhaust-ports *u u* in the expansion slide-valve. The exhaust takes place continuously no matter in which direction the engine is running.

The main and expansion slide-valves are arranged in such a manner that they may be pushed both together on the shaft through a distance equal to the distance between the openings on the cylindrical surface of the rotary shaft of the two pairs of channels *g h* and *i k*. Thus by shifting the position of the slides on the shaft the steam may be made to enter into the working chambers either through one or through the other pair of channels, according to the direction in which the engine is required to run. According to whether the steam-admission ports of the main and expansion slide-valves are corresponding with the openings of one or the other pair of channels *g h* or *i k*, the exhaust will pass through the other pair of channels $i\,k$ or $g\,h$ to one or the other of the exhaust-ports $r$ in the main slide-valve after having passed through the corresponding port $u$ in the expansion slide-valve.

In order that the main and expansion slide-valves should not move too far on the shaft, they are provided with a collar $w$ or some other suitable stopping device.

While the main slide-valve can only be moved longitudinally along the shaft, the expansion slide-valve is arranged capable of being turned in relation to the main slide-valve, whereby it will be possible to alter the size of the admission-ports $p$, or, in other words, to regulate the period of admission according to requirements.

By means of a suitable scale on the main slide-valve and on the expansion slide-valve it will be easy to adjust the relative positions of the said slides to one another so as to obtain any desired ratio of expansion.

By arranging the expansion slide-valve in such a manner that it may also be capable of moving longitudinally inside the main slide-valve the expansion slide-valve if connected, for instance, with a centrifugal governor may serve as a brake when the engine is running too fast. In the position of the rotary shaft as shown in Fig. 2 the steam is assumed to enter into the working chamber I through the channel $i$ in the direction shown by the arrow $x$. The steam fills the space behind the piston $b$, the bottom of the working chamber I being formed during the beginning of the admission by the recess in the disk $d$ and later on by the disk itself as this disk is moving around in the direction shown by the arrow $y$. Through this arrangement certain quantity of steam gets closed up in the recess of the disk, and as the disk is revolving this steam acts as a counter-pressure against the steam that enters the working chamber when the other recess is acting as the bottom, thus helping to diminish the pressure on the bearings of the disk.

The rotary shaft revolves in the direction shown by the arrow $z$, the steam admission continuing as long as the opening of the channel $i$ on the cylindrical surface of the shaft passes in front of the port $q$.

As already mentioned, the admission-port may be shortened by turning the expansion-slide. When the piston $b$ has reached the end of the working chamber I and enters into the working chamber II through the recess in the disk $e$, the steam that has been used in the working chamber I will get access to the channel $g$ in the rotary shaft and be carried away through this channel and the corresponding port $u$ in the expansion slide-valve and $r$ in the main slide-valve to the common exhaust-pipe $t$. About at the same time that the exhaust from the working chamber I begins the steam is admitted through the channel $k$ into the working chamber III, in which the bottom is formed by the disk $f$.

If it be desired to reverse the engine, the main slide-valve, together with the expansion slide-valve, is moved along the shaft until it strikes against the collar $w$. The steam-admission belt $o$ will then be brought in front of the openings of the channels $g$ and $h$, while the openings of the channels $i$ and $k$ correspond with the other exhaust-port $r$. From the above it is obvious that the engine may be reversed at any time regardless of the position of the pistons at the time of reversing.

Instead of allowing the exhaust-steam to escape into the atmosphere it may be led into the main slide-valve belonging to another rotary engine of the same construction as the one described above, which latter engine may have the rotary shaft and the spindles for the revolving disks in common with the first engine. By thus connecting together several engines the steam may be used to its utmost capacity.

Having now particularly described and ascertained the nature of this said invention and in what manner the same is to be performed, I declare that what I claim is—

1. In an engine, the combination with a rotating shaft having feed and exhaust ports therein, of an annular valve mounted to slide on the shaft and having therein a number of feed-ports, and exhaust-ports situated on each side of the feed-ports, and a second annular valve encircling the first and arranged to turn thereon and formed with continuous exhaust-passages registering with the exhaust-ports of the first-named valve and with a continuous feed-passage having ports leading from it to the feed-ports of the first-named valve.

2. In an engine, the combination with a rotating shaft having feed and exhaust ports therein, of an annular valve fitted to slide on the shaft and having a feed-port therein and exhaust-ports on each side of the feed-port, a second annular valve arranged to turn on the first valve and having a feed-port registering with the feed-port of the first valve, and exhaust-passages registering with the exhaust-ports of the first-named valve.

3. In an engine, the combination of a rotary shaft having feed and exhaust ports therein, the ports being situate at different points along the length of the shaft, and a valve arranged to slide on the shaft and formed with an inlet-port and with an exhaust-port at each side of the inlet-port, the distance between the feed-ports and the exhaust-ports of the valve being equal to the distance between the feed and exhaust passages of the shaft.

4. In an engine, the combination with a rotary shaft having feed and exhaust ports therein, of an annular valve arranged to slide on the shaft and formed with a number of feed-ports and a number of exhaust-ports, the exhaust-ports being on each side of the feed-ports, and a second annular valve arranged to turn on the first-named valve and having continuous exhaust-passages respectively in registry with the exhaust-ports of the first-named valve, the second valve also having a feed-passage and having ports leading from the feed-passage to the feed-ports of the first-named valve.

In testimony that I claim the foregoing as my invention I have signed my name in presence of two subscribing witnesses.

CARL CHRISTIAN JENSEN.

Witnesses:
 R. LIDEMARK,
 W. ALGER.